United States Patent
Azakami et al.

(10) Patent No.: US 7,090,935 B2
(45) Date of Patent: Aug. 15, 2006

(54) MAGNETIC CARD

(75) Inventors: Minoru Azakami, Shinjuku-Ku (JP); Kenji Ueda, Shinjuku-Ku (JP); Tetsuya Toshine, Numazu (JP); Toru Nishioka, Ushiku (JP); Atsushi Umezawa, Ushiku (JP); Akihiro Mizumura, Ushiku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/787,259

(22) Filed: Feb. 27, 2004

(65) Prior Publication Data

US 2004/0234816 A1    Nov. 25, 2004

(30) Foreign Application Priority Data

Feb. 28, 2003   (JP)   ............................. 2003-052961
Sep. 30, 2003   (JP)   ............................. 2003-341039

(51) Int. Cl.
    *G11B 5/80*       (2006.01)
(52) U.S. Cl. ......................................... 428/834; 283/82
(58) Field of Classification Search ........... 428/694 TP, 428/834; 283/82
    See application file for complete search history.

(56) References Cited

U.S. PATENT DOCUMENTS 6,278,683 B1 *  8/2001  Hayashi ................... 369/275.5
2002/0191234 A1 * 12/2002  Ishimoto et al. ............... 359/1

* cited by examiner

*Primary Examiner*—Stevan A. Resan
(74) *Attorney, Agent, or Firm*—Sughrue Mion, PLLC

(57) ABSTRACT

A magnetic card of the invention comprises a card substrate 11 on which a magnetic layer 12, a thin-film layer 13 formed of a metal or a metal compound for concealing the magnetic layer, a printed layer 14 and a volume hologram layer 15 are successively provided, wherein magnetic information is recorded on or read from a volume hologram layer side. The volume hologram layer 15 is composed essentially of a photosensitive material comprising a cationic polymerizable compound, a radical polymerizable compound, a photo-radical polymerization initiator system that is sensitive to light of a specific wavelength to polymerize the radical polymerizable compound, and a photo-cationic polymerization initiator system that is less sensitive to the light of a specific wavelength but sensitive to light of another wavelength to polymerize the cationic polymerizable compound. The magnetic card is improved in terms of wear resistance to sliding contact with a magnetic head, and ensures precise writing or reading of magnetic recording data, with improved ability to prevent forgery.

8 Claims, 3 Drawing Sheets

MAGNETIC CARD

BACKGROUND OF THE INVENTION

The present invention relates to a magnetic card comprising a card substrate and a magnetic layer provided thereon for magnetic recording of information in a machine-readable fashion.

Having on a card substrate a magnetic layer for magnetic recording of an ID number or other data attributable to a card's user in a machine-readable fashion, magnetic cards are now widely used in the form of cash cards or credit cards.

So far, the security of magnetic cards has been enhanced by concealment of magnetic layers from view. As well known in the art, the aesthetic property and ability to prevent forgery of a magnetic card are improved by provision of a concealment printed layer or a hologram layer on the magnetic layer. One such known magnetic card has a multilayer structure that has a magnetic layer, an underlying concealment thin-film layer formed of a metal or a metal compound, a printed layer and a hologram layer provided successively on a card substrate, so that information can be recorded onto the magnetic layer from the surface of the volume hologram laid on it and the information recorded on the magnetic layer can be read (JP-A 10-198950).

Among holograms known in the art, there is a relief hologram that may be formed of a thin film but has some difficulty in achieving three-dimensional appearances, and so conversion of the relief hologram to a volume hologram is now in the making. A volume hologram layer has a good stereoscopic effect, and enables a hologram to be recorded by a multiplicity of interference fringes parallel with its surface in a depth direction. A significant feature (redundancy) of the volume hologram layer is that even when more or less shaved away in the depthwise direction due to slide contact with a magnetic head, the same image can be reconstructed although its brightness drops.

However, the volume hologram layer is very soft, offering a wear resistance problem with slide contact with a magnetic head for machine reading, even when a protective layer is provided over the surface thereof. Usually, it is extremely difficult to form volume hologram layers in a thin-film state. For this reason, when the volume hologram layer is laminated on a magnetic stripe, spacing losses become heavy upon reading of magnetic information, rendering precise writing or reading of magnetic recording data difficult.

An object of the present invention is to provide a magnetic card having a volume hologram layer on its surface, which has improved wear resistance to sliding contact with a magnetic head, and ensures precise writing or reading of magnetic recording data, with much more improved ability to prevent forgery.

SUMMARY OF THE INVENTION

According to the first aspect of the invention, there is provided a magnetic card comprising a card substrate and a multilayer structure comprising a magnetic layer provided on a partial area or a whole area of said card substrate for magnetically recording information in a machine-readable fashion and a thin-film layer provided in such a way as to conceal at least said magnetic layer and formed of a metal or a metal compound, and further comprising a printed layer provided on a partial area or a whole area of said card substrate including an area of said multilayer structure and a volume hologram layer provided on a partial area or a whole area of said card substrate including an area of said printed layer and an area of said multilayer structure, wherein magnetic information is recorded on or read from said volume hologram layer, characterized in that said volume hologram layer is made of a photosensitive material comprising a cationic polymerizable compound, a radical polymerizable compound, a photo-radical polymerization initiator system that is sensitive to light of a specific wavelength to polymerize said radical polymerizable compound, and a photo-cationic polymerization initiator system that is less sensitive to said light of a specific wavelength but sensitive to light of another wavelength to polymerize said cationic polymerizable compound.

According to the second aspect of the invention, there is provided a magnetic card comprising a card substrate and a multilayer structure comprising a printed layer provided on a partial area or a whole area of said card substrate and having a given color and a magnetic layer provided on an area of said printed layer for magnetically recording information thereon in a machine-readable fashion and having a substantially identical color with that of said printed layer, and further comprising a volume hologram layer provided on a partial area or a whole area of said card substrate including an area of said printed layer and an area of said multilayer structure, wherein magnetic information is recorded on or read from said volume hologram layer, characterized in that said volume hologram layer is made of a photosensitive material comprising a cationic polymerizable compound, a radical polymerizable compound, a photo-radical polymerization initiator system that is sensitive to light of a specific wavelength to polymerize said radical polymerizable compound, and a photo-cationic polymerization initiator system that is less sensitive to said light of a specific wavelength but sensitive to light of another wavelength to polymerize said cationic polymerizable compound.

According to the third aspect of the invention, there is provided a magnetic card comprising a transparent card substrate, a multilayer structure comprising a visible light transmission layer portion provided on said card substrate and capable of absorbing infrared radiation, a magnetic layer provided on an area of said card substrate that is other than an area of said visible light transmission layer portion for magnetically recording information thereon in a machine-readable fashion and a magnetic layer concealment printed layer provided on an area other than said area of said visible light transmission layer portion in such a way as to cover said magnetic layer, and further comprising a volume hologram layer provided on a partial area or a whole area of said card substrate including an area of said multilayer structure, wherein magnetic information is recorded on or read from said volume hologram layer and said magnetic card is capable of visible light transmission at an area of said visible light transmission layer portion in a sectional direction thereof, characterized in that said volume hologram layer is made of a photosensitive material comprising a cationic polymerizable compound, a radical polymerizable compound, a photo-radical polymerization initiator system that is sensitive to light of a specific wavelength to polymerize said radical polymerizable compound, and a photo-cationic polymerization initiator system that is less sensitive to said light of a specific wavelength but sensitive to light of another wavelength to polymerize said cationic polymerizable compound.

Since the volume hologram layer is composed of a specific photosensitive material, the magnetic card of the invention is much more improved in terms of wear resistance to sliding contact with a magnetic head, the ability to write and read magnetic data to and from the magnetic layer, and the ability of prevent forgery.

DESCRIPTION OF THE PREFERRED EMBODIMENTS

For instance, a magnetic card is available in a rectangular form having a long side of 85.60 mm, a short side of 53.98 mm and a thickness of 0.76 mm, as prescribed by IOS (the International Standardization Organization) 7810. As shown by dotted lines in FIG. 1 to be referred to later, a magnetic layer 12 for magnetic recording of information about a card's owner is formed on the magnetic card in a striped (tape) shape having a long side of the same size as the long side of the card. It is noted that the word "transparent" used herein means that a magnetic card is transparent to at least visible light.

Figure 1:
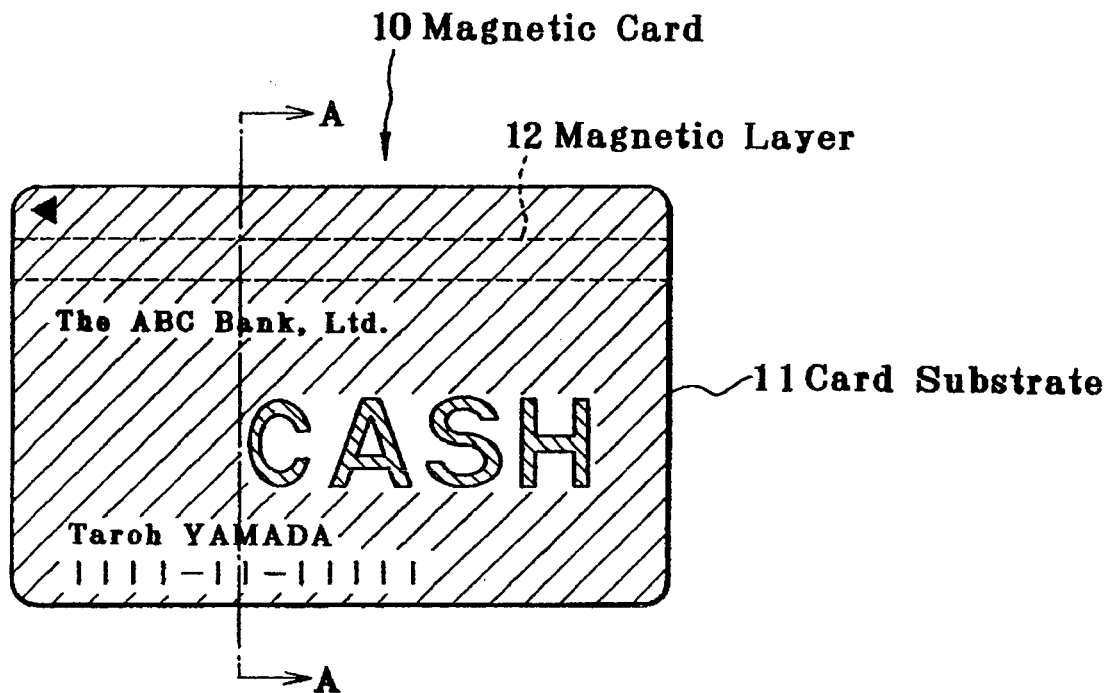
FIG. 1 is illustrative in plane of one embodiment of the first magnetic recording card.

One embodiment of the first magnetic card according to the invention is now explained with reference to FIGS. 1 and 2. FIG. 1 is a plan view of the first magnetic card and FIG. 2 is a sectional view as taken on line A—A of FIG. 1.

Figure 2:
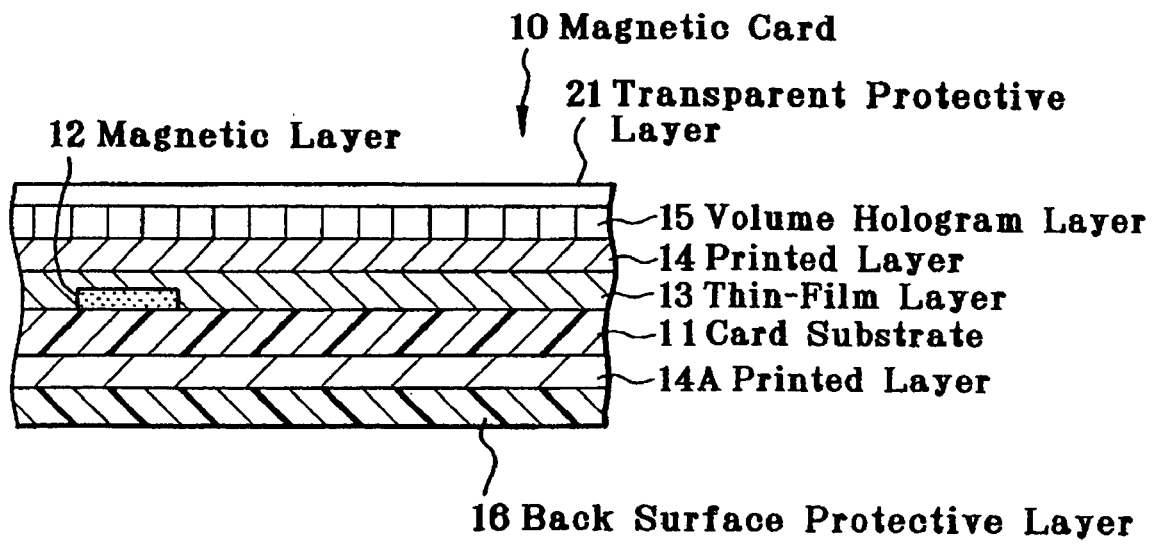
FIG. 2 is a sectional view taken on line A—A of FIG. 2.

As shown in FIGS. 1 and 2, a magnetic card 10 comprises an opaque card substrate 11 on which there are stacked a magnetic layer 12, a thin-film layer 13, a printed layer 14, a volume hologram layer 15 and a transparent protective layer 21 in this order. On the back surface of the card substrate there are stacked a printed layer 14A and a back surface protective layer 16 in this order.

While, in FIG. 2, the magnetic layer 12 is shown to be laminated on the card substrate 11, it is understood that the magnetic layer could be buried in the card substrate upon thermocompression lamination in such a way as to be flush with the surface of the card substrate. While the thin-film layer 13, printed layer 14 and volume hologram layer 15 are shown to be provided all over the area of the card substrate, it is understood that the thin-film layer 13 could be provided in such a way as to conceal at least the magnetic layer 12, and the printed layer 14 could be provided at a partial area of the card substrate inclusive of the thin-film layer or in the form of a combined printed layer and (textual) information display layer. Likewise, the volume hologram layer 15 could be provided on a partial area of the card substrate inclusive of the printed layer and thin-film layer. Preferably, the transparent protective layer 12 could be provided all over the area of the card substrate.

By way of example, the card substrate 11 is formed of a single or composite sheet made of a material selected from resins such as polyvinyl chloride, vinyl chloride-vinyl acetate copolymer, polyester such as PETG, polycarbonate, polyamide, polyimide, cellulose diacetate, cellulose triacetate, polystyrene resin, acrylic resin, polypropylene and polyethylene, metals such as aluminum and copper, papers, and papers impregnated with resins or latexes.

In FIG. 2, the card substrate 11 is shown to have a single-layer structure; however, the card substrate could have a multilayer structure. For instance, when the card substrate is formed of polyvinyl chloride (PVC), it could have a four-layer structure obtained by hot pressing of a laminate comprising a 100 μm-thick transparent PVC oversheet/280 μm-thick white PVC oversheet/280 μm-thick white PVC sheet/100 μm-thick transparent PVC oversheet. The white PVC sheet is provided to make the card substrate so opaque that the magnetic layer cannot be seen through the back surface of the card. Obtained by milling a white inorganic material with PVC, the white PVC sheet has also a function of cutting off light in an infrared region.

Although depending on the type of material, the substrate sheet could have a thickness of 0.1 mm to 2.0 mm, it is understood that when a magnetic card is prepared according to the ISO standard, the thickness of the substrate sheet is set such that the magnetic card has a total thickness of about 0.76 mm.

A striped or tape form of magnetic layer 12 is provided on the front surface of the card substrate. The magnetic layer has an ID number or other data ascribable to a magnetic card's user magnetically recorded thereon in a machine-readable manner. For instance, when the card substrate used has a multilayer structure, it is preferable that the magnetic layer is integrated with and laminated on the substrate sheet by previously placing the magnetic layer on the surface of the oversheet and then burying it in the oversheet by hot pressing upon substrate sheet formation.

Preferably, the magnetic layer is formed by applying a magnetic tape onto the card substrate. Since the magnetic information to be recorded on the magnetic layer is recorded thereon or read therefrom through the volume hologram layer, the magnetic layer should preferably produce given magnetic output even when there are large spacing losses. For instance, use could be made of high output tapes manufactured by Dainippon Ink & Chemicals, Inc., such as "Memorydick T-1201", "Memorydick T-1202" and "Memorydick T-1203".

Alternatively, the magnetic layer could be formed by coating and drying of a magnetic paint on the card substrate. Magnetic ink is prepared by dispersion of magnetic powders in a binder solution comprising a heat-resistant resin such as polyurethane. The magnetic powders used herein, for instance, are barium ferrite powders having a coercive force of 580 or 720 Oe, a rectangular ratio of at least 0.85 and an aspect ratio of at least 1.5.

The magnetic layer concealment thin-film layer 13 is provided on a partial or the whole area of the card substrate 11 in such a way as to cover the area of the magnetic layer 12. The thin-film layer is provided to conceal off a position where the magnetic layer is located, so that the security of the magnetic card can be enhanced. The thin-film layer is a layer comprising a metal or a metal compound. To this end, for instance, Al, Cr, Fe, Co, Ni, Cu, Ag, Au, Ge, Mg, Sb, Pb, Cd, Bi, Sn, Se, In, Ga and Rb could be used alone or in the form of a metal compound comprising two or more such metals (e.g., a metal oxide or nitride). Of those metals, Al, Cr, Ni, Ag or Au is particularly preferred.

The thin-film layer could be formed by vapor deposition, electrodeposition, sputtering or like processes. The "vapor deposition" referred to herein is a process for bonding a metal or metal compound film to an application surface, wherein a metal or metal compound is melted and evaporated in a vacuum by direct conduction of electric currents through it, so that the ensuing vapor is deposited onto the application surface placed there, and the "electrodeposition" is a process for precipitating a metal or metal compound on an electrode by electrolysis, typically an electroplating process. The "sputtering" is a process wherein gas atoms ionized by glow discharge in an argon gas under reduced pressure impinge on a target to deposit atoms flying out of the target onto the surface of an application member.

The thin-film layer has a thickness large enough for visible light not to transmit through it, typically of about 200 to 1,000 Å, and preferably 500 Å. With such a thin-film layer is provided on an area, that area becomes opaque to visible light, so that the magnetic layer located underneath it is concealed from the surface of the magnetic card. It is noted that when no magnetic layer is provided on the card substrate, a heat-resistant layer formed of resin such as polyurethane could be provided as an internal protective layer.

The printed layer 14 is provided on a partial or almost the whole area of the card substrate inclusive of the area of the thin-film layer. The printed layer could have patterns and/or symbols and/or colors printed thereon. In FIG. 1, the printed layer is shown to have a logo or the like indicative of what purpose the magnetic card is used for, such as a bank name or "CASH". When the printed layer has primarily textual information printed thereon, the underlying thin-film layer is often seen through this printed layer. Alternatively, the first printed layer could first be provided in such a way as to cover the underlying thin-film layer, and then the second printed layer with textual information printed thereon could be laid over the first printed layer. For instance, the printed layer is formed as by silk printing with a thickness of 1 to 2 µm.

The volume hologram layer 15 is now explained. The volume hologram layer is provided on a partial or the whole area of the card substrate inclusive of the areas of the printed layer and the thin-film layer. The volume hologram layer comprises a photosensitive material with a volume hologram recorded thereon, wherein the photosensitive material has a thickness sufficiently larger than a spacing between interference fringes formed by object light and reference light. A three-dimensional structure comprising interference fringes is recorded as such on the photosensitive material. The volume hologram layer is formed either by recording interference light defined by object light and reference light directly on a volume hologram-forming material layer or exposure of a volume hologram-forming material layer while a volume hologram master plate is in close contact therewith for replication. For an industrial scale fabrication the latter process is convenient.

The volume hologram layer according to the invention uses a photosensitive material comprising a compound capable of cationic polymerization, a compound capable of radical polymerization, a photo-radical polymerization initiator system that is sensitive to a specific wavelength light to polymerize the compound capable of radical polymerization, and a photo-cationic polymerization initiator system that is less sensitive to the aforesaid specific wavelength light but is sensitive to light of another wavelength to polymerize the compound capable of cationic polymerization.

For recording of a volume hologram, this photosensitive material is coated on a support material, then irradiated with laser or other light to which the photo-radical polymerization initiator system is sensitive, and finally irradiated with light of a wavelength different than that of the aforesaid laser light. More specifically, after the radical polymerizable compound is polymerized by irradiation with laser or other light (hereinafter called the first exposure), the cationic polymerizable compound is subjected to full-exposure (hereinafter after called the post-exposure) whereby the photo-cationic polymerization initiator system in the composition is decomposed to generate Brønsted's acid or Lewis acid for cationic polymerization.

The cationic polymerizable compound used herein is a liquid at room temperature such that the polymerization of the radical polymerizable compound occurs consistently in a composition having a relatively low viscosity. Such a cationic polymerizable compound, for instance, includes diglycerol polyglycidyl ether, pentaerythritol polyglycidyl ether, 1,4-bis(2,3-epoxypropoxyperfluoroisopropyl) cyclohexane, sorbitol polyglycidyl ether, trimethylolpropane polyglycidyl ether, poly(ethylene glycol) diglycidyl ether, and phenylglycidyl ether.

Preferably, the radical polymerizable compound has at least one ethylenic unsaturated double-bond per molecule. The mean refractive index of the radical polymerizable compound is larger than that of the cationic polymerizable compound, preferably by at least 0.02. A lower mean refractive index is not preferred because refractive index modulation becomes insufficient. The radical polymerizable compound, for instance, includes acrylamide, methacrylamide, styrene, 2-bromostyrene, phenyl acrylate, 2-phenoxyethyl acrylate, 2,3-naphthalenedicarboxylic acid (acryloxyethyl) monoester, methyl-phenoxyethyl acrylate, nonylphenoxyethyl acrylate, and β-acryloxyethylhydrogen phthalate.

The photo-radical polymerization initiator system could be such that the first exposure for hologram fabrication allows it to generate radicals that then polymerize the radical polymerizable compound. For this initiator system, a sensitizer that is generally a component capable of absorbing light could be used in combination with an active radical generation compound or an acid generation compound. Often, colored compounds like dyes are used for the sensitizer in the photo-radical polymerization initiator system because it absorbs visible laser light; however, cyanine dyes are preferable for making colorless, transparent holograms. A cyanine dye is generally likely to decompose upon exposure to light. When a hologram with such a cyanine dye added thereto is subjected to the post-exposure according to the invention or left exposed to indoor light or sunlight for a few hours to a few days, it does not have any absorption in the visible region, yielding a colorless, transparent hologram because of decomposition of the dye in the hologram. Exemplary cyanine dyes are anhydro-3,3'-dicarboxymethyl-9-ethyl-2,2'-thiacarbocyaninebetaine, anhydro-3-carboxymethyl-3',9-diethyl-2,2'-thiacarbocyaninebetaine, 3,3',9-triethyl-2,2'-thiacarbocyanine-iodine salt, and 3,9-diethyl-3'-carboxymethyl-2,2'-thiacarbocyanine.iodine salt.

For the active radical generation compound that could be used in combination with the cyanine dyes, diaryliodoniums or 2,4,6-substituted-1,3,5-triazines could be used. When higher photosensitivity is needed, use of diaryliodoniums is particularly preferred. The aforesaid diaryliodoniums are exemplified by diphenyliodonium, 4,41'-dichlorodiphenyliodonium and 4,4'-dimethoxy-diphenyliodonium, and the aforesaid 2,4,6-substituted-1,3,5-triazines are exemplified by 2-methyl-4,6-bis (trichloromethyl)-1,3,5-triazine and 2,4,6-tris (trichloromethyl)-1,3,5-triazine.

The photo-cationic polymerization initiator system could be such that although less sensitive to the first exposure, yet it is sensitive to the post-exposure using light of a wavelength different than that of light used for the first exposure to generate Brønsted's acid or Lewis acid that polymerizes the cationic polymerizable compound. Compounds that leave the cationic polymerizable compound unpolymerized during the first exposure are particularly preferred. The photo-cationic polymerization initiator system, for instance, includes diaryliodonium salts, triarylsulfonium salts or iron arene complexes. Preferable but not exclusive triarylsulfonium salts include tetrafluoroborates, hexafluorophosphates and hexafluoroantimonates of the iodoniums mentioned in conjunction with the photo-radical polymerization initiator system, and preferable but not exclusive triarylsulfonium salts include triphenylsulfonium and 4-t-butyltriphenylsulfonium.

If necessary, the photosensitive composition could be used in combination with binder resins, thermo-polymerization preventives, silane coupling agents, plasticizers, coloring agents, etc. for the purpose of improving the film formation capability and film thickness of the composition prior to hologram formation, and allowing interference fringes formed by polymerization by laser or other light irradiation to be stabilized until before the post-exposure. The binder resin should be such that it is well compatible with the cationic or radical polymerizable composition, typically exemplified by chlorinated polyethylene, polymethyl methacrylate, copolymers of methyl methacrylate with alkyl esters of other (meth)acrylic acid, copolymers of vinyl chloride with acrylonitrile, and polyvinyl acetate. The binder resin could have a cationic polymerizable or other reactive group in its side or main chain.

The photosensitive composition should comprise, on the basis of the total weight thereof, 2 to 70% by mass, preferably 10 to 50% by mass of the cationic polymerizable compound, 30 to 90% by mass, preferably 40 to 70% by mass of the radical polymerizable compound, 0.3 to 8% by mass, preferably 1 to 5% by mass of the photo-radical polymerization initiator system and 0.3 to 8% by mass, preferably 1 to 5% by mass of the photo-cationic polymerization initiator system, and these components should be used in such a way as to provide a total amount of 100% by mass.

The photosensitive composition is prepared by milling the essential components and optional components without or, if necessary, with a ketone solvent such as methyl ethyl ketone, an ester solvent such as ethyl acetate, an aromatic solvent such as toluene or xylene, a cellosolve solvent such as methyl cellosolve, an alcohol solvent such as methanol, an ether solvent such as tetrahydrofuran or dioxane, or a halogen base solvent such as dichloromethane or chloroform, in a cold, dark place using a high-speed stirrer, for instance.

When the support film is in a discrete sheet state, the recording layer comprising the photosensitive composition is formed by coating of a coating solution (having a solid content of 15 to 25% by mass) of the aforesaid photosensitive composition, using bar coating, spin coating, dip coating or like coating techniques. When the support film is in a rolled, continuous state, coating is carried out by means of gravure coating, roll coating, die coating, comma coating or the like. The volume hologram layer is solidified using drying or curing means depending on the coating solution used.

In the volume hologram layer, interference fringes are recorded by polymerization of the radical-polymerizable compound using an ordinary holographic aligner with laser or other light (having a wavelength of, e.g., 300 to 1,200 nm). At this polymerization stage, a hologram is formed by light diffracted by the recorded interference fringes. To provide further polymerization of the cationic polymerizable compound that stays un-reacted, at the post-exposure step, the hologram is irradiated all over its surface with light (having a wavelength of, e.g., 200 to 700 nm), to which the photo-cationic polymerization initiator system is sensitive, thereby obtaining the end hologram. It is here noted that prior to the post-exposure, the recording layer could be treated by heat or infrared radiation to modify diffraction efficiency, peak wavelength of diffracted light, half-amplitude, etc. In the invention, the reconstruction wavelength for the volume hologram should be in the range of, e.g., 300 nm to 1,200 nm.

The volume hologram layer has a thickness of 5 μm to 10 μm, and preferably 5 to 7 μm. Although depending on the intensity of the magnetic field that the magnetic layer has, if the combined thickness of the layers laid over the magnetic layer is generally up to 10 μm, then data are writable from the surface of the magnetic card to the magnetic layer and recorded data are well readable, because the magnetic layer can have a sufficient magnetic field intensity.

The volume hologram layer of the invention with the hologram recorded thereon has a glass transition temperature of 50° C. or higher, preferably 80° C. or higher, and more preferably 100° C. or higher, although there is no particular upper limit thereto. This ensures that sufficient thermocompression transfer conditions can be set for magnetic card fabrication so that magnetic cards having improved adhesion can be obtained.

The volume hologram layer according to the invention can have a breaking strength of 0.01 kgf/mm$^2$ to 5 kgf/mm$^2$, preferably 0.03 kgf/mm$^2$ to 3 kgf/mm$^2$, and a breaking extension of 0.01% to 30%, preferably 0.1% to 10%.

Further, the volume hologram layer according to the invention is a relatively tough film having a pencil hardness (JIS K5400-1990) of 3B to 3H, so that a magnetic card can be formed with a surface having improved wear resistance to a magnetic head.

In this connection, a similar volume hologram recording material "HRF800x001" (Du Pont) is found to have a glass transition temperature of 50° C. or lower after treated in the same manner as mentioned above. That material has an acceptable breaking strength of 2.30 kgf/mm$^2$ yet a breaking extension of 138% and a pencil hardness of as soft as 4B or 5B, indicating that there is a problem with giving the wear resistance to a magnetic head to the surface of a magnetic card. There is bound to be another problem that conditions for setting thermo-compression transfer without having adverse influences on the recorded hologram image become stringent upon magnetic card fabrication.

A volume hologram, because of being difficult to fabricate or record, is now used just only for aesthetic purposes but also as a counterfeit-proof, authentication mark as an example. The magnetic card of the invention is so improved in terms of the adhesion of the volume hologram layer that its peeling off the surface of the magnetic card is hardly achievable, and so the volume hologram layer is much higher than an ordinary volume hologram material in terms of the effect on prevention of forgery by its reapplication to other magnetic card.

The glass transition temperature of the volume hologram layer is measured by a solid viscoelasticity analyzer RSA-II (Rheometrics Co., Ltd.), and both the breaking strength and the breaking-extension are measured by a tensile compression testing machine "SV-201-E" made by Imada Seisakusho Co., Ltd. according to JIS K7127-1989.

A light diffraction image reconstructed by the volume hologram layer is expressed by characters and/or patterns and/or symbols, combined with or without colors. The volume hologram layer possesses transparency, and so characters, patterns, etc. expressed by the printed layer can be seen through it. By allowing the color tones of the volume hologram and printed layers to have complementary relations to each other, it is possible to prevent a display on the printed layer from becoming dark due to the presence of the volume hologram. Thus, even when the printed layer and the volume hologram layer are superposed one upon another in the thickness direction, the images on both can be seen; it is possible to draw images on the card substrate without any mutual restrictions.

Preferably, the transparent protective layer 21 formed of a transparent resin should be provided on the volume hologram layer. The transparent resin used to this end is exemplified by thermoplastic resins, ionized radiation curable resins and thermosetting resins. More specifically, the thermoplastic resins include methacrylic resin such as polymethyl methacrylate, polyacrylic ester resin, polyvinyl chloride resin, cellulose resin, silicone resin, chlorinated rubber and casein. The ionized radiation curable resin is broken down into an electron beam curable resin and an ultraviolet radiation curable resin, and the latter ultraviolet radiation curable resin is composed of the same components as the former ionized radiation curable resin, except containing a photo-polymerization initiator and a sensitizer.

The ionized radiation curable resin is generally composed of a monomer, oligomer or polymer that has generally a radical-polymerizable active group as a film-forming component in its structure. The monomer is exemplified by derivatives such as (meth)acrylic esters, and the oligomer and polymer are exemplified by urethane acrylates and polyester acrylates. The ultraviolet radiation curable resin is obtained in the form of a composition comprising the above monomer having a radical polymerizable active group or the like and a photo-polymerization initiator such as acetophenones, benzophenone, Michler-benzoylbenzoate, α-aminoximester, tetramethylthiuram monosulfide and thioxanthones as well as a photosensitizer such as n-butylamine, triethylamine and tri-n-butylphosphine.

Optionally, the transparent surface protective layer could contain an additive such as a lubricant for achieving frictional resistance to a magnetic head, or the like, and various surfactants in view of coat capability as well. If the transparent protective layer is colored in a given color (e.g., metallic color), it is then possible to further aesthetic enhancements.

A composition for forming the transparent protective layer is dispersed and mixed with a suitable solvent, and the mixture is coated on a temporal substrate having a releasable surface, followed by drying and curing. The resultant layer is laminated on the volume hologram layer.

Referring specifically to how to cure the ionized radiation curable resin composition, electron beam irradiation could be carried out using an electron beam of 50 to 1,000 Kev, preferably 100 to 300 Kev emitted from a Cockcroft-Walton accelerator at an exposure of 0.1 to 100 Mrad, preferably 1 to 10 Mrad, and ultraviolet irradiation could be carried but using ultraviolet radiation emitted from an ultrahigh pressure mercury lamp or the like at an exposure of 0.1 to 10,000 mJ/cm$^2$, preferably 10 to 1,000 mJ/cm$^2$.

The transparent protective layer should be formed in such a way that its post-drying thickness fall in the range of 0.1 μm to 5 μm, preferably 0.5 to 3 μm, from which selection should be made with recording on or reading from the magnetic layer in mind.

Alternatively, a transparent protective film could be used. For instance, use could be made of various films such as polyethylene film, polypropylene film, polyethylene fluoride film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethylene-perfluoroalkylvinyl ether copolymer film, polyethylene terephthalate film, and polyimide film.

Preferably, the surface of the transparent protective film to be laminated on the volume hologram layer should be treated with corona or flame in such a way as to be easily bondable or provided with an easily bondable layer such as an acid-modified polyester resin layer. Where necessary, the outer surface of the transparent protective film could be hard coated as by dip coating, spray coating or roll coating of, for instance, silicone resin, fluorine-containing silicone resin, melamine alkyd resin or urethane-acrylate resin (of the ultraviolet radiation curable type). Further, the hard coated surface of the surface protective film could be subjected to releasing treatment to prevent other film from being applied to the surface protective film thereby peeling off it for the purpose of forgery. For the releasing treatment, a fluorine releasing agent, a silicone releasing agent, a stearic acid releasing agent, a wax releasing agent or the like could be coated on the hard coated surface of the transparent protective film by means of dipping coating, spray coating, roll coating or the like. The transparent surface protective film could have an appropriate thickness with writing to and reading from the magnetic layer in mind.

One embodiment of how to fabricate the magnetic card is now explained.

(1) A magnetic tape is placed over a given position of an oversheet that forms a part of a substrate sheet to obtain a magnetic layer/oversheet laminate.

(2) According to the arrangement shown in FIG. 2, the magnetic layer/oversheet laminate obtained at (1), a white opaque core sheet and a transparent oversheet are stacked one upon another, and hot pressed at a temperature of 150° C. and a pressure of 25 kg/cm$^2$ for 15 minutes to obtain a card substrate with the magnetic layer located on one surface.

(3) By vapor deposition or the like, a thin-film layer is formed over a partial or the whole area of the card substrate having the magnetic layer in such a way as to conceal the magnetic layer, after which a suitable pictorial pattern or the like is printed on the thin-film layer or a card substrate area to form a printed layer.

(4) After a transparent protective layer is formed by coating on a releasable temporal substrate, a volume hologram layer having a volume hologram recorded thereon is laminated on the transparent protective layer. Then, an adhesive layer is laminated on the transparent protective layer to prepare a volume hologram transfer foil.

For instance, a polyethylene terephthalate or polypropylene film subjected to releasing treatment is usable for the releasable temporal substrate. The adhesive used herein is obtained with a post-drying thickness of 2 to 3 μm by full milling of a binder with a solvent or diluent, if required, with plasticizers, stabilizers, curing agents, etc., wherein the binder could be chosen from heat sealable or adhesive resins such as vinyl chloride/vinyl acetate copolymer, ethylene/vinyl acetate copolymer, vinyl chloride/propionic acid copolymer, rubbery resin, cyanoacrylate resin, cellulosic resin, ionomer resin and polyolefinic copolymer.

(5) The volume hologram transfer foil obtained at 4) above is laminated at the adhesive layer on the thin-film layer of the laminate obtained at (3) above for hot lamination at 120° C. to 140° C.

(6) A printed layer is provided on the back surface of the card substrate, and a back surface protective layer is laid over it. For instance, the back surface protective layer is formed by coating of a transparent or translucent vinyl chloride or other resin, and when it is in a film form, lamination is relied upon.

(7) The laminate with the respective layers laminated one upon another is thermocompressed, punched out in a given magnetic card form, and post-processed to make a magnetic card having a given total thickness. The temporal substrate should stay laminated on the volume hologram layer until use.

According to the first magnetic card, the volume hologram layer possesses transparency so that the underlying layer can be seen through; textual, pattern-wise or other information expressed on the printed layer can be seen through. When a light diffraction image by the volume hologram layer and an image on the printed layer are allowed to have complementary relations to each other, it is possible to provide clear observation of the printed layer; even when both the printed layer and the volume hologram layer are superposed one upon another in the thickness direction, images on both can be visually observed, thereby ensuring that images can be drawn on the card substrate without any mutual restrictions.

The magnetic layer is concealed by the thin-film comprising a metal film or the like from the surface of the magnetic card, so that where the magnetic layer is located can stay concealed, making the ability of the magnetic card to prevent forgery much higher than ever before.

The thin-film layer, printed layer, volume hologram layer and transparent protective layer are stacked on the magnetic layer, and a thinner film obtained as by vapor deposition is used as the thin-film layer while the volume hologram layer is formed of a specific material that can be made thinner. Accordingly, spacing losses due to the respective layers stacked on the magnetic layer can be so reduced that the intensity of the magnetic field needed upon reading by a magnetic head can be obtained. Further, the volume hologram layer is made of the specific material layer that is also capable of forming a relatively strong film, so that wear resistance can be given to the surface of the magnetic card.

The second magnetic card of the invention is now explained with reference to FIGS. 3 and 4.

Figure 3:
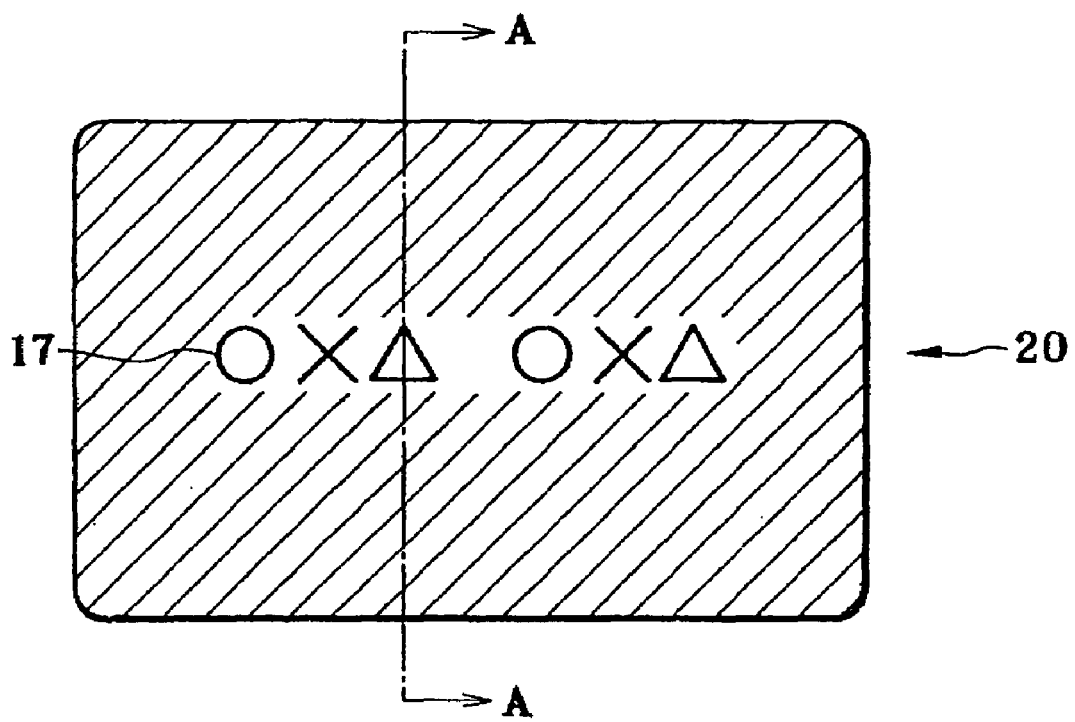
FIG. 3 is illustrative in plane of one embodiment of the second magnetic recording card.
Figure 4:
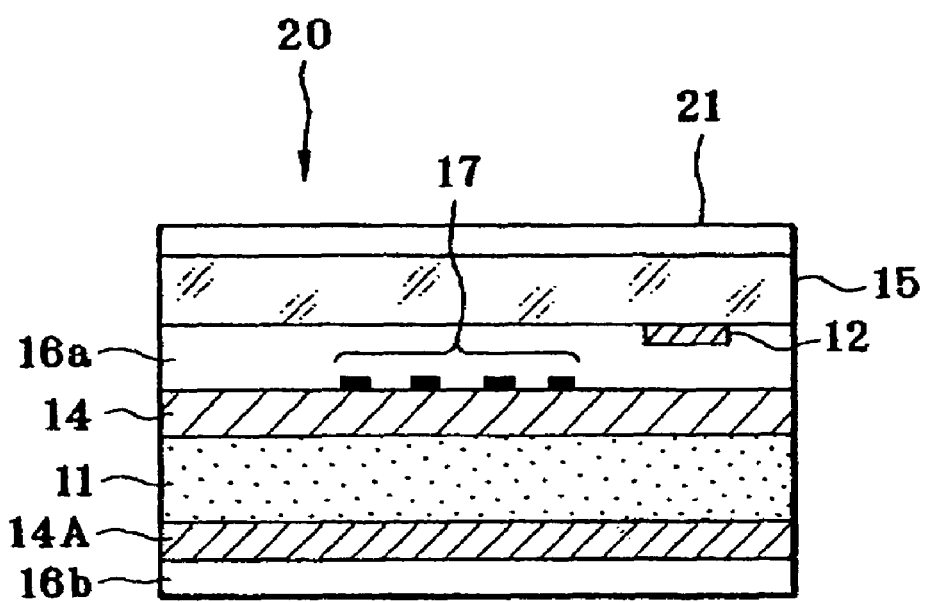
FIG. 4 is a sectional view taken on line A—A of FIG. 3.

FIG. 3 is illustrative in plane of the second magnetic card of the invention, and FIG. 4 is a sectional view taken on line A—A of FIG. 3. As depicted in FIGS. 3 and 4, a magnetic card 20 comprises a card substrate 11 that receives on its surface a printed layer 14, an information display layer 17, an oversheet layer 16a, a magnetic layer 12, a volume hologram layer 15 and a transparent protective layer 21 in a stacked manner, and receives on its back surface a printed layer 14A and a back surface protective layer 16b again in a stacked fashion.

In FIG. 4, the printed layer 14, oversheet layer 16a and volume hologram layer 15 are shown to be provided all over the area of the card substrate; however, the printed layer 14 could be provided on a partial area of the card substrate. While the oversheet 16a could be provided on a partial area of the card substrate, it is understood that the magnetic layer 12 must be located within an area of the printed layer which has substantially the same color as its color. The volume hologram layer 15 could be provided on a partial area of the card substrate; however, the transparent protective layer 21 should preferably be provided all over the area of the card substrate. optionally, the printed layer(s) could be interposed between the adjacent layers in the above respective layers.

A similar card substrate as referred to in connection with the first magnetic card could be used for the card substrate 11. In favor of providing a given thickness to the magnetic card, for instance, polyvinyl chloride (PVC) could be used. More specifically, there could be used a substrate sheet of three-layer construction obtained by hot pressing of a laminate comprising a 280-μm thick white PVC core sheet/280-μm thick white PVC core sheet/100-μm thick transparent PVC oversheet.

The printed sheet 14 is provided as by silk printing on a partial or the whole area of the core sheet in the card substrate. Having characters and/or patterns and/or symbols, the information display layer 17 should preferably be printed in a color different than that of the printed layer; for instance, textual information like "CASH CARD" or personal information should be printed. Specifically, when the information displayer layer is provided in white color, the underlying printed layer is provided in the form of a filled-in layer colored in black color.

Then, the 100-μm thick transparent oversheet 16a with the magnetic layer 12 laminated by thermocompression thereon is laminated on a partial or the whole area of the card substrate including the printed layer area. Preferably in this case, the magnetic layer 12 of the transparent oversheet 16a should be laminated on the volume hologram layer, so that upon formed into the magnetic card, spacing losses can be reduced thereby making sure of reading or writing of magnetic information.

As shown in FIG. 4, the printed layer and the magnetic layer laid over it should preferably be colored in substantially the same color. For instance, if the printed layer is provided in black ink, where the black magnetic layer is located can then be well concealed from view.

Then, the volume hologram layer 15 and, if necessary, the transparent protective layer 21 are provided on a partial or the whole area of the card substrate including the printed layer and magnetic layer areas, as is the case with the first magnetic card.

As in the first magnetic card, the printed layer 14A and back surface protective layer 16b are provided on the back surface of the card substrate 11. The information display layer 17, that is provided where necessary, is provided on the printed layer in FIG. 4; however, it could be interposed between the oversheet layer 16a and the volume hologram layer.

How to fabricate the second magnetic card 20 is now explained.

(1) A magnetic tape is laid over a given position of a transparent oversheet to obtain a laminate comprising a magnetic layer/transparent oversheet.

(2) A pictorial pattern or the like is printed on one surface of a white core sheet for provision of the printed layer 14.

(3) According to the arrangement shown in FIG. 4, the oversheet having the magnetic layer, obtained at (1), the white core sheet having the printed layer, obtained at (2), a white core sheet and an oversheet, four layers in all, are stacked together. Thereafter, the stacked arrangement is hot pressed to obtain a laminate comprising three layers, a printed layer/oversheet layer/magnetic layer, on a substrate sheet of an oversheet/white core sheet/white core sheet.

(4) After a transparent protective layer is formed by coating on a releasable temporal substrate, a volume hologram layer with a volume hologram recorded thereon is laminated on the transparent protective layer, and the volume hologram is fixed in place. Then, an adhesive layer is laminated on the volume hologram layer to prepare a volume hologram transfer foil.

(5) The volume hologram transfer foil obtained at (4) above is laminated on the adhesive layer on the magnetic layer of the laminated obtained at (3) above for heat lamination at 120° C. to 140° C.

(6) The printed layer 14A is provided on the back surface of the substrate sheet, and the back surface protective layer 16b is provided on the printed layer 14A.

(7) A card with the laminated layers is thermo-compressed, then punched out in a given form, and finally post-processed into a magnetic card 20. It is noted that the temporal substrate should stay laminated on the volume hologram until use.

The second magnetic card, because the printed layer and the magnetic layer are provided in substantially the same color, ensures that where the magnetic layer is located can be well concealed from view, thereby giving much higher forgery prevention capability and security to the magnetic card. As explained with reference to the first magnetic card, the underlying layer is so visible due to the transparency of the volume hologram layer that characters, pictorial patterns or the like expressed by the printed layer can be visually observed. When a light diffraction image by the volume hologram layer and an image on the printed layer are allowed to have complementary relations to each other, it is possible to obtain such effects as mentioned above. It is preferable to provide the printed layer in black color because the light diffraction image by the volume hologram layer is easy to view.

The volume hologram layer and transparent protective layer are stacked on the magnetic layer, and the volume hologram layer is formed of a specific material that can be made thinner. Accordingly, spacing losses due to the respective layers stacked on the magnetic layer can be so reduced that the intensity of the magnetic field needed upon reading by a magnetic head can be obtained. Further, the volume hologram layer is made of the specific material layer that is also capable of forming a relatively strong film, so that wear resistance can be given to the surface of the magnetic card.

The third magnetic card of the invention is now explained with reference to FIGS. 5, 6 and 7.

Figure 5:
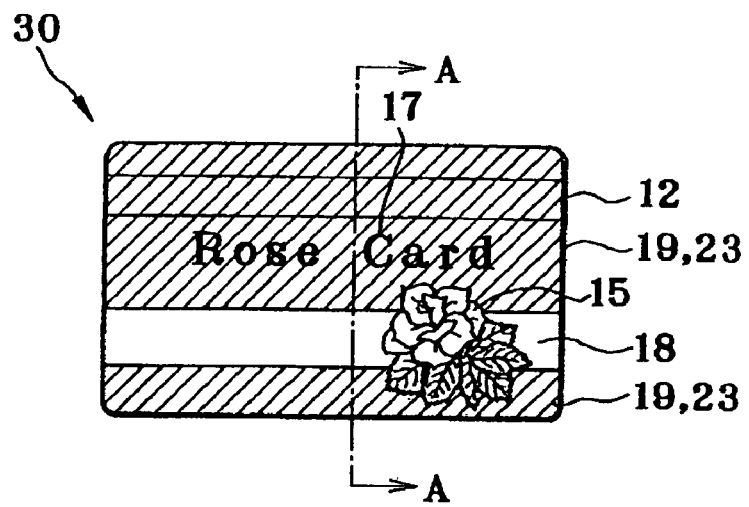
FIG. 5 is illustrative in plane of one embodiment of the third magnetic recording card.
Figure 6:
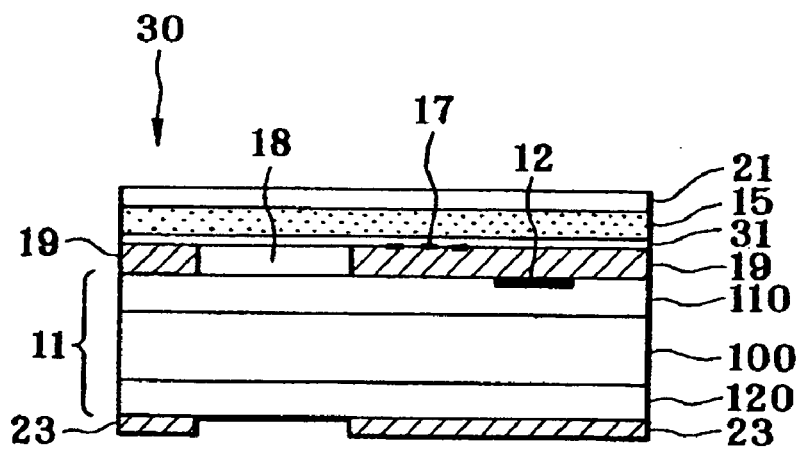
FIG. 6 is a sectional view taken on line A—A of FIG. 5.
Figure 7:
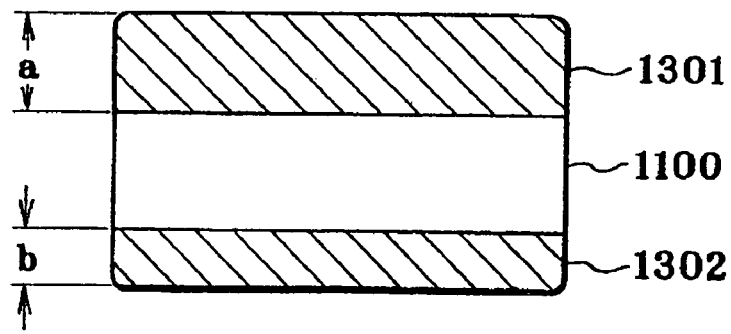
FIG. 7 is illustrative of light transmittance restriction zones and a light transmittance non-restriction zone on a magnetic card prescribed by the ISO standard.

FIG. 5 is illustrative in plane of the third magnetic card of the invention, FIG. 6 is a sectional view taken on line A—A of FIG. 5, and FIG. 7 is illustrative of light transmittance restriction zones and a light transmittance non-restriction zone.

As shown in FIGS. 5 and 6, a third magnetic card 30 of the invention, for instance, comprises a card substrate 11 that comprises a laminate composed of three layers, an oversheet 110, a core sheet 100 and an oversheet 120. A magnetic layer 12 is laminated on the front surface of the laminate, and a printed layer 19 for concealment of the magnetic layer is provided on a part of the card substrate area while a visible light transmission layer portion 18 is defined by another part of the card substrate area. These upper layers are optionally provided with an information display layer 17, and an adhesive layer 31, a volume hologram layer 15 and a transparent protective layer 21 are stacked on a part or all over the surface of the card substrate area. On the back surface of the card substrate, a printed layer 23 for concealment of the magnetic layer is laminated at a position corresponding to the printed layer 19 for concealment of the magnetic layer. It is noted that the printed layer could be interposed between appropriate adjacent layers in the above respective layers.

The ISO standard concerning magnetic cards or the like prescribes that to sense information recorded on a magnetic layer by means of an optical sensor, light transmittance restriction zones 1301 (width a) and 1302 (width b) are defined by a 21-mm area from the upper end and a 10-mm area from the lower end of a card, as shown in FIG. 7. Each zone must cut off light of wavelengths of 400 to 1,000 nm corresponding to the range of a visible light region to an infrared wavelength region. It is noted that this standard does not apply to a light transmittance non-restriction zone 1100.

In the third magnetic card that complies with this standard, the transmittance non-restriction zone 1100 provides a light transmission layer portion. As shown in FIGS. 5 and 6, the third magnetic card is selectively coated in such a strip pattern that the visible light transmission layer portion 18 is sandwiched between both ends defined by the printed layers 19 for concealment of the magnetic layers, and the length of the long side of each printed layer 19, 23 is the same as that of the long side of the card. The length of the long side of the printed layer 19, 23 for concealment of the magnetic layer is specified for the purpose of letting a reader recognize the length of the card.

The visible light transmission layer portion 18 is provided to obtain a so-called "skeleton" type magnetic card through which light transmits from the front surface to the back surface thereof. Provision of the visible light transmission layer portion makes it possible to improve flexibility in displaying various designs on the magnetic card, and enables a bar code or the like opaque to visible light to be built in the visible light transmission portion so as to be well compatible with various optical sensors.

The card substrate, because of having to possess transparency, is typically formed of polyethylene, polypropylene, polystyrene, polyester, polyvinyl chloride, polyvinyl acetate and methacrylic resin, among which polyvinyl chloride and polyester resin such as PET-G are preferred. Alternatively, the card substrate could be formed of a multilayer material, e.g., a three-layer structure material comprising a 50-μm or 100-μm thick transparent oversheet 110/660-μm or 560-μm thick transparent core sheet 100/50-μm or 100-μm thick transparent oversheet or a four-layer structure material comprising two 330-μm thick transparent core sheets and two 280-μm thick transparent core sheets, with a total thickness of about 0.76 mm in either case.

For the transparent oversheet 110, an oversheet obtained by alloying or co-extrusion of one or two or more of the aforesaid resins systems, for instance, "Dearfix PG-MCT" made by Mitsubishi Resin Co., Ltd. could be used. The transparent core sheet 100 could additionally contain impact improvers having a refractive index substantially equal to that of the resin used so as to make sure of its transparency and material strength. For instance, when a polyvinyl chloride substrate having a refractive index of 1.53 is used, a methyl methacrylate-butadiene-styrene copolymer (MBS) having a refractive index of 1.53 may be added thereto, and when a PET-G substrate having a refractive index of 1.56 is used, an MBS having a refractive index of 1.55 may be added thereto. For the transparent core sheet 100, for instance, "Dearfix PG-SK2" made by Mitsubishi Resin Co., Ltd. could be used.

Whenever necessary, the transparent core sheet could be milled with an infrared absorber or, alternatively, it could be laminated together with the transparent oversheet with a visible light transmitting ink layer interposed between them.

The magnetic layer 12 is provided at the required position of the transparent oversheet 100 in the same manner as in the first magnetic card. On the magnetic layer there are stacked some layers such as the printed layer for concealment of the magnetic layer and the volume hologram layer, resulting possibly in read output drops due to spacing losses. With this in mind, a powder-rich high-density magnetic recording material should preferably be used as the magnetic layer material. Specifically, preference is given to the magnetic layer material mentioned in conjunction with the first magnetic card.

The printed layer 19 for concealment of the magnetic layer is formed by silk screen printing using a magnetic layer concealment ink. For the magnetic layer concealment ink, it is preferable to use metal powders obtained by pulverizing a metal such as aluminum down to a given size and controlling metal powders in such a way that their reflectivity and non-transparency with respect to light in a wavelength region of 400 to 1,000 nm reach maxima. The metal powders are processed along with a binder resin and a solvent into a viscosity well suite for silk screen printing. For instance, "VAHS No. 2" made by Showa Ink Co., Ltd. could be used. The printed layer 19 for concealment of the magnetic layer is provided at a thickness of 3 to 5 μm for the purpose of concealing the magnetic layer and optional designs from the surface of the card, while the printed layer 23 for concealment of the magnetic layer is provided at a thickness of 2 to 6 μm for the purpose of concealing the position of the magnetic layer from view from the back surface of the card.

The information display layer 17 is formed using a printing ink having a composition known for silk screen printing or offset printing.

The visible light transmission layer portion 18, to which the ISO standard does not apply, may be provided by silk screen printing that makes use of only the binder resin in the infrared absorption ink to be described later. However, if care is taken of cases where an infrared sensor is located on that area for reading purposes depending on the type of card reader, it is then acceptable that an infrared cutoff function is allocated to the card substrate by containing an infrared absorber therein, as already explained. It is here noted that the infrared absorber costs much, and that the infrared cutoff function may be given to the printed layer for concealment of the magnetic layer, too. In accordance with the invention, an infrared absorption ink having the maximum absorption band in the infrared region is thus used to form the visible light transmission layer portion, thereby obtaining a magnetic card well compatible with various card readers.

The infrared absorption ink comprises an infrared absorber and a binder resin, which are dissolved or dispersed in an organic solvent to a viscosity well suite for silk printing. For instance, the infrared absorber used to this end is at least one selected from metal oxides such as iron oxide, cerium oxide, tin oxide and antimony oxide; complex compounds such as indium oxide-tin, tungsten hexachloride, tin chloride, cupric sulfide, chromium-cobalt complex salt and thiol-nickel complex; and organic compounds such as aminium compound, diimonium compound and phathalocyanine compound. The binder resin is optionally selected from polyester resins such as bisphenol A type epoxy resin, bisphenol F type epoxy resin, polyvinyl acetate and polyvinyl propionate; and polyolefinic resins such as polyethylene, polypropylene, polystyrene, and styrene-vinyl acetate resin. The infrared absorber is used in an amount of 2 to 10 parts by mass per 100 parts by mass of the binder resin. As shown in FIG. 6, the infrared absorber is then printed by silk screen printing on a card substrate area free from the magnetic layer concealment printed layer 19 at a dry thickness of 3 to 5 μm and in a stripe pattern. It is here noted that the infrared absorption printed layer could be provided on either the transparent oversheet or the transparent core sheet in the card substrate, as already described.

The volume hologram layer 15 and, whenever necessary, the transparent protective layer 21 are provided on a partial or the whole area of the card substrate with the visible light transmission layer portion and the magnetic layer concealment printed layer provided thereon while the adhesive layer 31 is interposed between them, as is the case with the first magnetic card. On the back surface of the card substrate, the magnetic layer concealment printed layer 23 is located at a position corresponding to the magnetic layer concealment printed layer 19, using a similar material.

In the third magnetic card, the visible light transmission layer area should preferably have a transmittance of at least 60% with respect to light (of 380 to 780 nm wavelengths) in the visible light region as measured in the sectional direction of the card, and a transmittance of up to 3% with respect to infrared light (of 800 to 1,050 nm wavelengths) as measured all over the surface of the card.

One embodiment of how to fabricate the third magnetic card is now explained.

(1) A magnetic tape is laid over a given position of the oversheet 110 and hot pressed to obtain a laminate comprising a magnetic layer/oversheet. Thereafter, the magnetic layer concealment printed layer 19 is pattern printed on an area of the laminate in such a way as to cover the magnetic layer while the visible light transmission layer portion 18 is pattern printed on other area.

(2) According to the arrangement of FIG. 5, the oversheet 110 obtained at (1) is laid over one surface of the transparent core sheet 100 and the oversheet 120 over another surface for hot pressing.

(3) After the transparent protective layer is formed by coating on a releasable temporal substrate, the volume hologram layer with a volume hologram recorded thereon is laminated on the transparent protective layer, and the volume hologram is fixed in place. Then, the adhesive layer is laminated on the volume hologram layer to prepare a volume hologram transfer foil.

(4) According to the arrangement of FIG. 5, the volume hologram transfer foil obtained at (3) above is laminated at the adhesive layer on the laminate obtained at (2) above for heat lamination at 120° C. to 140° C.

(5) On the back surface of the substrate sheet, the printed layer for concealment of the back surface magnetic layer is formed in a given pattern.

(6) A card with the laminated layers is thermo-compressed, then punched out in a given form, and finally post-processed into a magnetic card. It is noted that the temporal substrate should stay laminated on the volume hologram until use.

Provision of the visible light transmission layer portion makes it possible for the third magnetic card to have improved flexibility in displaying various designs thereon, and enables a bar code or the like opaque to visible light to be built in the visible light transmission portion so as to be well compatible with various optical sensors. Where the magnetic layers are located can be concealed by the magnetic layer concealment printed layers, so that the ability of the magnetic card to prevent forgery is much more improved with ever higher security.

The magnetic layer concealment printed layer, volume hologram layer and transparent protective layer are stacked on the magnetic layer, and the volume hologram layer is formed of a specific material that can be made thinner. Accordingly, spacing losses can be so reduced that the intensity of the magnetic field needed upon reading by a magnetic head can be maintained. Further, the volume hologram layer is made of the specific material layer that is also capable of forming a relatively strong film, so that improved wear resistance can be given to the surface of the magnetic card.

The $1^{st}$, $2^{nd}$ and $3^{rd}$ magnetic cards of the invention could have an IC or optical card function through an IC module or an optical recording portion provided on the back surface of the card substrate. The magnetic cards of the invention could be used in various card forms inclusive of cash cards, credit cards, ID cards and membership cards.

The magnetic cards of the invention are now explained with reference to inventive and comparative examples.

EXAMPLE 1

Preparation of Volume Hologram Layer Transfer Foil First Laminate of Releasable Film/Volume Hologram Layer/Releasable Film A volume hologram recording material having the following composition was coated as a hologram forming material on a PET film (50-μm thick Lumilar T-60 made by Toray Industries, Inc.) in such a way as to provide a dry thickness of 5 μm, using gravure coating.

| | |
|---|---|
| Polymethyl methacrylate resin (molecular weight: 200,000): | 500 parts by mass |
| 3,9-Diethyl-3'-carboxylmethyl-2,2'-thiacarbocyanine iodine salt: | 5 parts by mass |
| Diphenyliodonium hexafluoroantimonate: | 60 parts by mass |
| 2,2-bis[4-(acryloxydiethoxy)phenyl]propane: | 800 parts by mass |
| Pentaerythritol polyglycidyl ether: | 800 parts by mass |

A PET film subjected to surface releasing treatment (50-μm thick "SP-PET" made by Tohcello Co., Ltd.) was laminated on the coated surface to prepare a first laminate.

Second Laminate of Substrate/Transparent Surface Protective Layer

A coating solution having the following composition was uniformly coated as a transparent surface protective layer on a PET film (50-μm thick Lumilar T-60 made by Toray Industries, Inc.) at a post-drying thickness of 1 μm using a slide die.

| | |
|---|---|
| Pentaerythritol triacrylate (PET 30 made by Nippon Kayaku Co., Ltd.): | 4 parts by mass |
| Photo-initiator (Irgacure 184 made by Chiba Specialty Chemicals, Japan | 0.2 part by mass |
| Methyl isobutyl ketone: | 37 parts by mass |

The obtained coating film was cured by irradiation with UV radiation from an H bulb in an UV irradiator (made by Fusion UV System Co., Ltd.) used as a light source at an exposure of 1,000 mJ/cm² (calculated on a 365 nm basis) to prepare a second laminate.

Third Laminate of Heat-Sensitive Adhesive Layer/Releasable Sheet

A heat-sensitive adhesive (EC2000 made by Chuo Rika Co., Ltd.) was coated on a surface releasable PET film (50-μm thick "SP-PET" made by Tohcello Co., Ltd.) at a dry thickness of 1 μm to prepare a third laminate.

Preparation of Volume Hologram Transfer Foil

Using 514-nm wavelength laser light, a Lippmann hologram was recorded on the first laminate, which was then heated at 100° C. for 10 minutes, followed by removal of one releasable film from the first laminate. Then, the second laminate was laminated at the transparent surface protective layer on the exposed volume hologram layer at 80° C. to obtain a laminated arrangement of a substrate/transparent surface protective layer/volume hologram layer/releasable film.

The obtained multilayer structure was irradiated with light from a high-pressure mercury lamp at an exposure of 2,500 mJ/cm² for fixation of the hologram, followed by removal of the releasable film. Then, the third laminate was laminated at the heat-sensitive adhesive on the exposed volume hologram layer at 100° C. to prepare a volume hologram transfer foil of a substrate/transparent surface protective layer/volume hologram layer/heat-sensitive adhesive layer/releasable sheet.

Preparation of Magnetic Card

A magnetic tape ("Memorydick 5-1202" made by Dainippon Ink & Chemicals, Inc., comprising a 100-μm thichick magnetic layer and a 1 to 2-μm thick heat seal (HS) layer with a width of 7.3 mm and a magnetic field intensity of 650 Oe) was laid over a 100-μm thick PVC oversheet for thermocompression, thereby laminating the magnetic layer on the oversheet. Then, a 560-m thick white core sheet and a 100-μm thick PVC oversheet were stacked on another side of the oversheet in this order for lamination. Finally, the laminate structure was hot pressed at a temperature of 150° C. and a pressure of 25 kg/cm² for 15 minutes to obtain a substrate sheet with the magnetic layer provided on one surface.

A 500-Å thick thin-film layer was formed by vacuum deposition of aluminum all over the area of this substrate sheet to conceal the magnetic layer, and a pictorial pattern was thereafter printed by silk printing on the thin-film layer to provide a 1-μm thick printed layer, thereby obtaining a laminate.

The releasable sheet was removed from the volume hologram transfer foil obtained as mentioned above, which was laminated at the adhesive layer on the printed layer of the laminate at a temperature of 120 to 140° C. for transfer of the volume hologram layer.

On the back surface of the card substrate, a pictorial pattern, precautions about use, etc. were printed by silk printing to provide a 1-μm thick printed layer thereon. Further, a 0.1-mm thick back surface protective layer comprising polyvinyl chloride resin was formed by coating on the printed layer.

The thus obtained laminate was thermocompressed at 150° C. and 10 kg/cm² for 1 minute by means of a hot stamp machine, and then punched out in a given form for the magnetic card shown in FIGS. 1 and 2, whereby the first magnetic card was prepared.

By measurement, the surface of the magnetic card was found to have a JIS K5400 pencil hardness of "H". Apart from this, a volume hologram was recorded on the first laminate of a releasable film/volume hologram layer/releasable film prepared in the same manner as in the volume hologram transfer foil to measure the pencil hardness of the surface of the volume hologram layer. As a result, this volume hologram layer was found to have a pencil hardness of "2B", and a glass transition temperature of 90° C. as well.

Using "CT-670" made by R/W Neuron. Co., Ltd., a post-recording test involving 4,000 reading cycles was carried out. As a result, there was neither any damage as by scratching to the surface of the magnetic card, nor defective reading of magnetic information. The surface of the obtained magnetic card was visually observed, but the magnetic layer was so concealed by the thin-film layer that where the magnetic layer was positioned could not be detected. Not only the volume hologram image but also the printed layer could be clearly observed.

EXAMPLE 2

A magnetic tape ("Memorydick T-1202" made by Dainippon Ink & Chemicals, Inc., comprising a 10-μm thick magnetic layer and a 1 to 2-m thick heat seal (HS) layer with a width of 7.3 mm and a magnetic field intensity of 650 Oe) was laid over a 100-μm thick PVC oversheet, and then thermocompressed to laminate the magnetic layer thereon, thereby obtaining a first laminate.

By means of silk screen printing using a black ink, a 3 to 5-μm thick black solid printed layer was provided all over the area of one surface of a 560-μm thick white core sheet, and then a white ink was used to form a textual pattern at a thickness of 1 μm, thereby obtaining a second laminate.

According to the lamination form shown in FIG. 4, the thus obtained first and second laminates and an additional 100-μm thick PVC oversheet were stacked together, and hot pressed at a temperature of 150° C. and a pressure of 25 kg/cm² for 15 minutes to obtain a laminate with the magnetic layer provided on one surface.

After removal of the releasable sheet from the volume hologram transfer foil prepared in Example 1, the volume hologram transfer foil was laminated at the exposed adhesive layer on the magnetic layer of the obtained laminate at 120 to 140° C. for transfer of the volume hologram layer.

On the back surface of the card substrate of the obtained laminate, a pictorial pattern, precautions about use, etc. are printed by silk printing to provide a 1-μm thick printed layer thereon. Further, a 0.1-mm thick back surface protective layer comprising polyvinyl chloride resin was formed by coating on the printed layer.

The thus obtained laminate was thermocompressed at 150° C. and 10 kg/cm² for 1 minute by means of a hot stamp machine, and then punched out in a given form for the magnetic card of FIGS. 3 and 4. In this way, a second magnetic card was prepared.

The surface of the magnetic card was found to have a JIS K5400 pencil hardness of "H", as measured in the same manner as in Example 1. Using "CT-670" made by R/W Neuron Co., Ltd., a post-recording test involving 4,000 reading cycles was carried out. As a result, there was neither any damage as by scratching to the surface of the magnetic card, nor defective reading of magnetic information.

The surface of the obtained magnetic card was visually observed, but where the magnetic layer was positioned could not be detected because of being undistinguishable from the underlying printed layer. The volume hologram image was not affected by heat applied for magnetic card fabrication; it could be clearly observed.

EXAMPLE 3

A magnetic tape ("Memorydick T-1202" made by Dainippon Ink & Chemicals, Inc., comprising a 10-μm thick magnetic layer and a 1 to 2-μm thick heat seal (HS) layer with a width of 7.3 mm and a magnetic field intensity of 650 Oe) was laid over a 100-μm thick transparent oversheet ("Dearfix PG-MCT" made by Mitsubishi Resin Co., Ltd.), and then thermocompressed to laminate the magnetic layer thereon.

Using a concealment ink ("VAHS No. 2 Silver" made by Showa Ink Co., Ltd.), magnetic layer concealment printed layers were provided by silk screen printing on the magnetic layer of the obtained laminate at a dry thickness of 5 μm in such a way that they were formed at a position where the magnetic layer was covered therewith as shown in FIG. 6 and at zones corresponding to the light transmission restriction zones 1301 and 1302 shown in FIG. 7.

Then, an infrared absorption ink was prepared by mixing together the following components.

| | |
|---|---|
| Polyester resin or binder for silk screen printing: | 100 parts by mass |
| Phthalocyanine infrared absorber having a maximum absorption band at wavelengths of 800 nm to 950 nm ("YKR5010" made by Yamamoto Kasei Co., Ltd.): | 3.0 parts by mass |
| Infrared absorber having a maximum absorption band at wavelengths of 950 nm to 1,050 nm ("YKR 3080" made by Yamamoto Kasei Co., LTd.): | 10.0 parts by mass |
| Solvent (methyl ethyl ketone): | 50 parts by mass |
| Solvent (toluene): | 50 parts by mass |

This ink was coated by silk screen printing at a dry thickness of 5 μm in such a way as to form a visible light transmission layer portion at a zone corresponding to the light transmittance non-restriction zone 1100.

Next, the obtained laminate, a 560-nm thick transparent core sheet ("Dearfix PG-SK2" made by Mitsubishi Resin Co., Ltd.) and a 100-μm thick transparent oversheet ("Dearfix PG-MCT" made by Mitsubishi Resin Co., Ltd.) were stacked together according to the arrangement shown in FIG. 6, and then hot pressed at a temperature of 150° C. and a pressure of 25 kg/cm² for 15 minutes to obtain a laminate.

After removal of the releasable sheet from the volume hologram transfer foil prepared in Example 1, the volume hologram transfer foil was laminated at the exposed adhesive layer on the magnetic layer of the obtained laminate at 120 to 140° C. for transfer of the volume hologram layer.

Next, a concealment ink ("VAHS No. 2 Silver" made by Showa Ink Co., Ltd.) was coated by silk screen printing at a dry thickness of 5 μm in such a way as to cover the magnetic layer and on a position corresponds to the printed layer for concealing the front magnetic layer, as shown in FIG. 6.

Using a hot stamp machine, the obtained laminate was thermocompressed at 150° C. and 10 kg/cm² for 15 minutes, and then punched out in a given form for the magnetic card shown in FIGS. 5 and 6, thereby preparing a third magnetic card.

By measurement on a spectrophotometer ("Model UV-3100PC" made by Shimadzu Corporation), the infrared transmission of the magnetic card to 800-nm to 1,050-nm wavelengths in a visible light transmission pattern was found to be 3% or lower.

By the same measurement as in Example 1, the magnetic card was found to have a surface pencil hardness of "B".

Using "CT-670" made by R/W Neuron Co., Ltd., a post-recording test involving 4,000 reading cycles was carried out. As a result, there was neither any damage as by scratching to the surface of the magnetic card, nor defective reading of magnetic information. The magnetic card was transparent at a portion corresponding to the visible light transmission layer portion, and when it was used with an ATM having a mechanism for sensing the passage of a card by an infrared sensor, there was no problem.

Then; the obtained magnetic card was visually observed from both its front and back surfaces. As a result, where the magnetic layer was located could not be detected because it was concealed by the magnetic layer concealment printed layer from view. The reconstructed hologram image could be well observed; so too were the printed layer.

COMPARATIVE EXAMPLE

A magnetic card was prepared as in Example 1 with the exception that an HFR800X001 film (Du Pont) having a three-layer construction of PET film/(3-μm thick) hologram recording material layer/releasable PET film was used as the first laminate in the volume hologram layer transfer foil. Referring to hologram recoding conditions, 514-nm wavelength laser light was used to record a Lippmann hologram, which was irradiated with ultraviolet radiation from a high-pressure mercury lamp at 200 mJ and then fixed by a 10-minute heating at 100° C. The volume hologram layer had a diffraction efficiency of 52%.

By measurement, the magnetic card was found to have a surface pencil hardness of "4B". A hologram was recorded on the first laminate of releasable film/volume hologram layer/releasable film in the same manner as described above. By measurement, the volume hologram layer was found to have a surface pencil hardness of "5B" and a glass transition temperature of 45° C.

As can be appreciated from a comparison with Example 1, the surface hardness of the magnetic card was significantly affected by the hardness of the volume hologram layer, even though the same protective layer was provided.

The obtained comparative magnetic layer was visually observed from its front surface. As a result, where the magnetic layer was located could not be found because it was concealed by the thin-film layer from view; however, it was noted that the reconstructed volume hologram image was significantly affected by the same lamination conditions as applied in Example 1 for card fabrication.

Using "CT-670" made by R/W Neuron Co., Ltd., a post-recording test involving 4,000 reading cycles was carried out. As a result, there were considerable damages as by scratching to the surface of the magnetic card, and so the reconstructed hologram image could not well be observed.

What we claim is:

1. A magnetic card comprising a card substrate and a magnetic layer provided on said card substrate for magnetically recording information thereon in a machine-readable fashion and further comprising a volume hologram layer provided on said magnetic layer, wherein magnetic information on said magnetic layer is recorded or read through the volume hologram layer, characterized in that said volume hologram layer has a glass transition temperature of 50° C. or higher, a breaking extension of 0.01% to 30% and a pencil hardness of 3B to 3H in a state with a hologram recorded thereon.

2. The magnetic card according to claim 1, characterized in that the volume hologram layer is a polymerized layer polymerized from a photosensitive material comprising a cationic polymerizable compound, a radical polymerizable compound, a photo-radical polymerization initiator system that is sensitive to light of a specific wavelength to polymerize the radical polymerizable compound, and a photo-cationic polymerization initiator system that is less sensitive to said light of a specific wavelength but sensitive to light of another wavelength to polymerize said cationic polymerizable compound.

3. The magnetic card according to claim 2, characterized by further comprising a card substrate, a multilayer structure comprising a magnetic layer provided on a partial area or a whole area of said card substrate for magnetically recording information thereon in a machine-readable fashion and a thin-film layer provided to cover at least said magnetic layer and formed of a metal or metal compound capable of concealing an underlay, a printed layer provided on a partial area or a whole area of said card substrate including an area of said multilayer structure, and a volume hologram layer provided on a partial area or a whole area of said card substrate including an area of said printed layer and the area of said multilayer structure.

4. The magnetic card according to claim 2, characterized by comprising a card substrate, a multilayer structure comprising a printed layer provided on a partial area or a whole area of said card substrate and having a given color and a magnetic layer provided on an area of said printed layer for magnetically recording information thereon in a machine-readable fashion, and a volume hologram layer provided on a partial area or a whole area of said card substrate including an area of said multilayer structure.

5. The magnetic card according to claim 2, characterized by comprising a transparent card substrate, a multilayer structure comprising a visible light transmission layer portion provided on said card substrate, a magnetic layer provided on an area of said card substrate that is other than an area of said visible light transmission layer portion for magnetically recording information thereon in a machine-readable fashion and a magnetic layer concealment printed layer provided on an area other than said area of said visible light transmission layer portion, and a volume hologram layer provided on a partial area or a whole area of said card substrate including an area of said multilayer structure.

6. The magnetic card according to claim 1, characterized by further comprising a card substrate, a multilayer structure comprising a magnetic layer provided on a partial area or a whole area of said card substrate for magnetically recording information thereon in a machine-readable fashion and a thin-film layer provided to cover at least said magnetic layer and formed of a metal or metal compound capable of concealing an underlay, a printed layer provided on a partial area or a whole area of said card substrate including an area of said multilayer structure, and a volume hologram layer provided on a partial area or a whole area of said card substrate including an area of said printed layer and the area of said multilayer structure.

7. The magnetic card according to claim 1, characterized by comprising a card substrate, a multilayer structure comprising a printed layer provided on a partial area or a whole area of said card substrate and having a given color and a magnetic layer provided on an area of said printed layer for magnetically recording information thereon in a machine-readable fashion, and a volume hologram layer provided on a partial area or a whole area of said card substrate including an area of said multilayer structure.

8. The magnetic card according to claim 1, characterized by comprising a transparent card substrate, a multilayer structure comprising a visible light transmission layer portion provided on said card substrate, a magnetic layer provided on an area of said card substrate that is other than an area of said visible light transmission layer portion for magnetically recording information thereon in a machine-readable fashion and a magnetic layer concealment printed layer provided on an area other than said area of said visible light transmission layer portion, and a volume hologram layer provided on a partial area or a whole area of said card substrate including an area of said multilayer structure.

* * * * *